Figure 1:
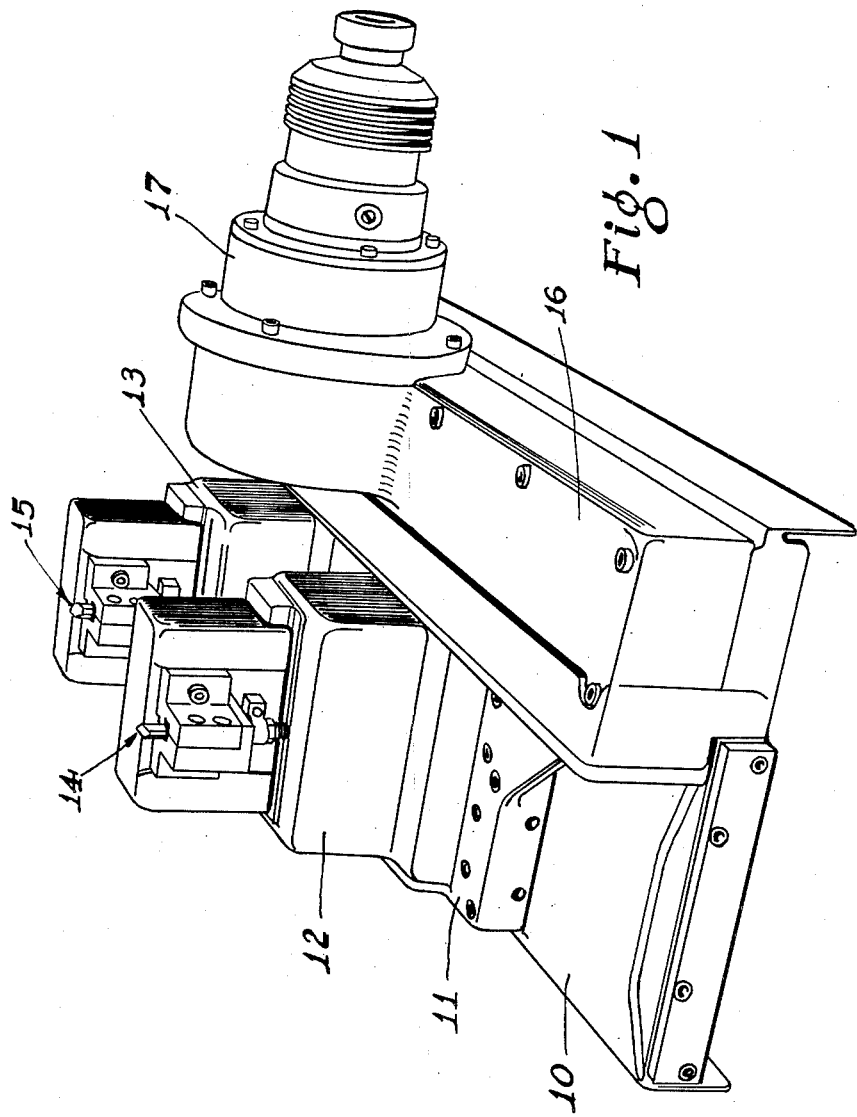

Nov. 10, 1953  N. HOGLUND  2,658,500
GRINDING WHEEL DRESSING APPARATUS
Filed Feb. 6, 1952  5 Sheets-Sheet 1

INVENTOR.
Nils Hoglund
BY
William A. Zaleski
ATTORNEY

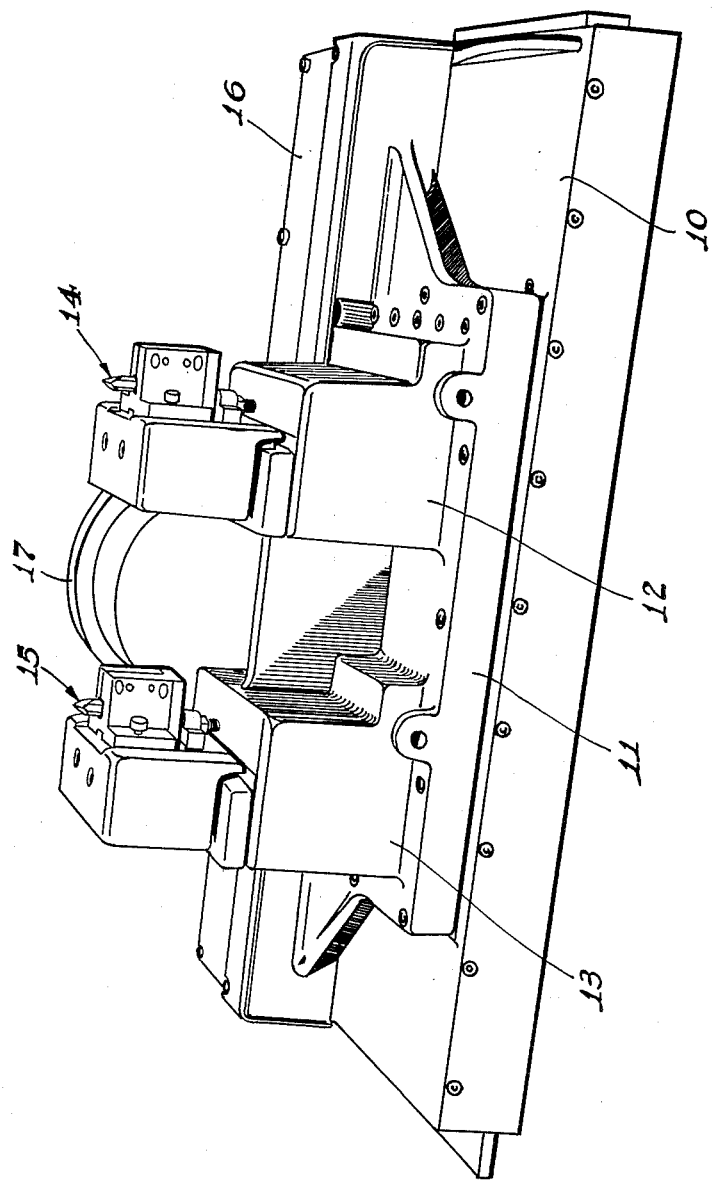

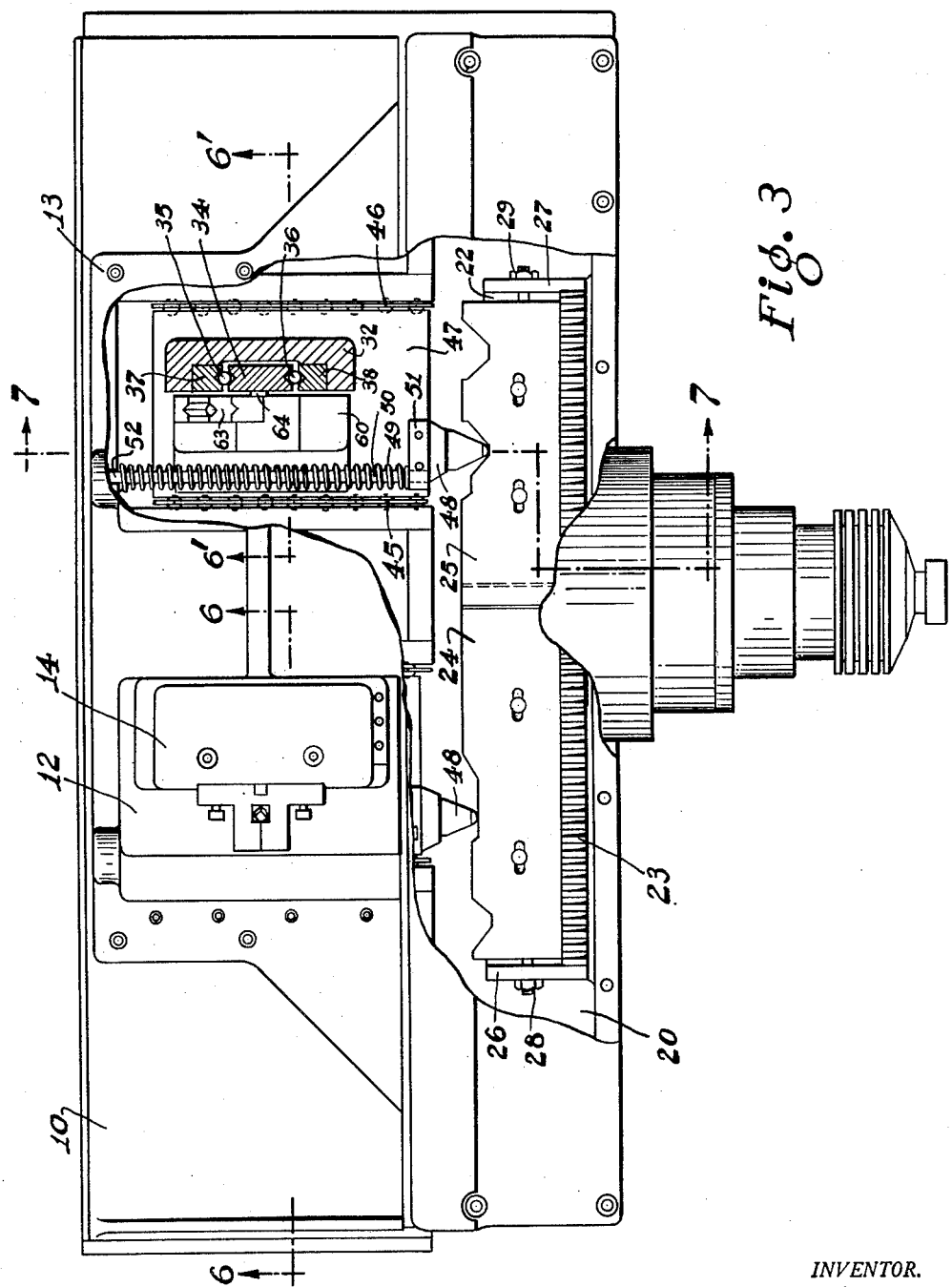

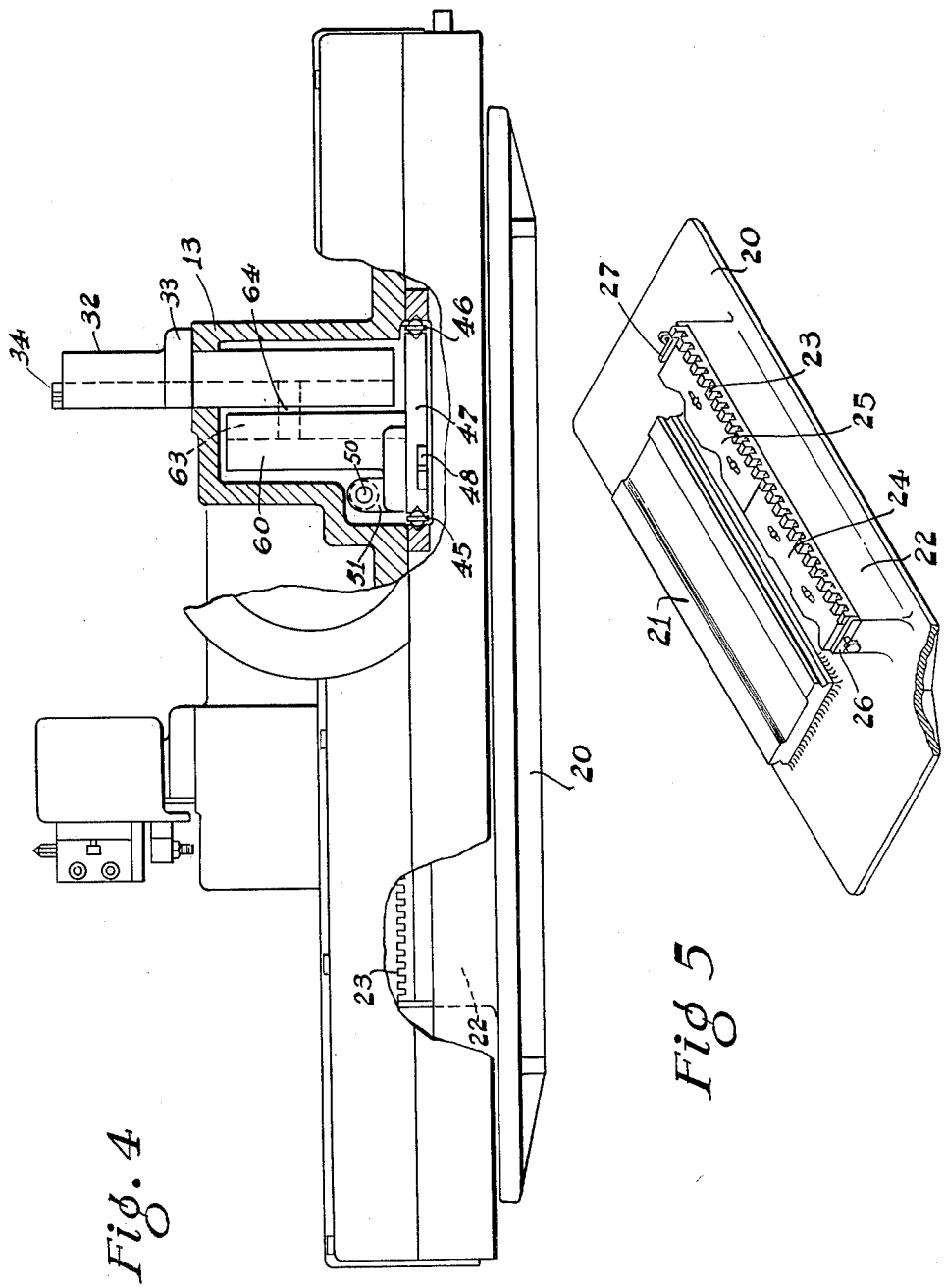

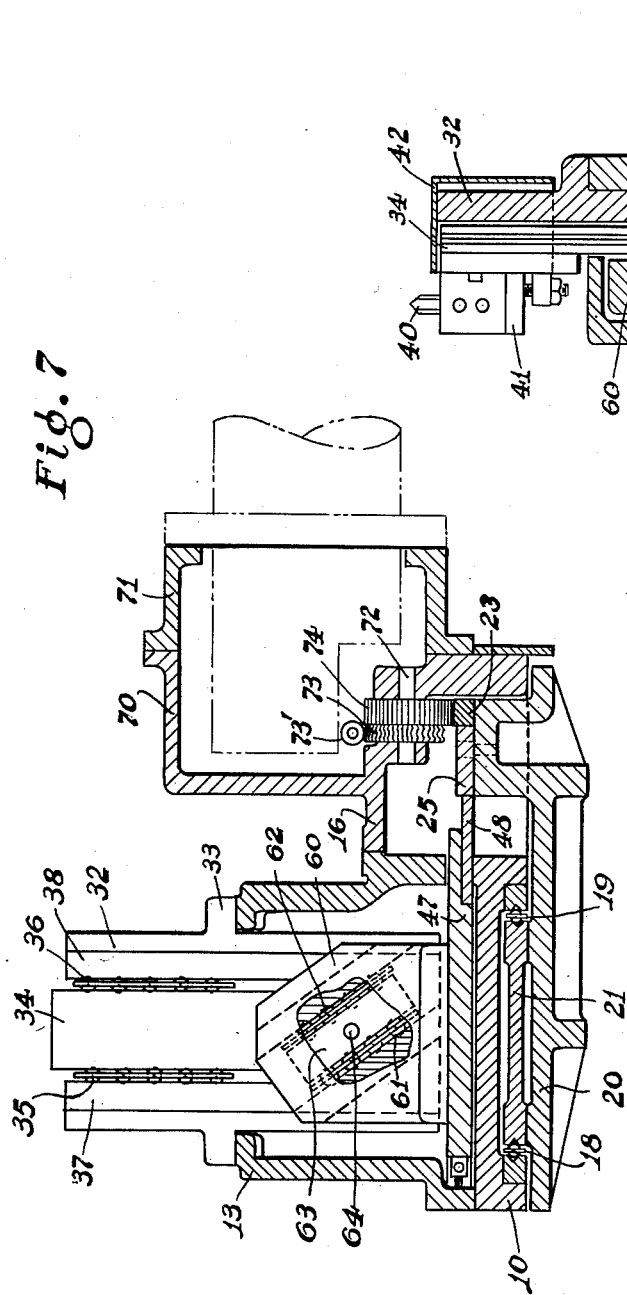

Patented Nov. 10, 1953

2,658,500

UNITED STATES PATENT OFFICE 2,658,500

GRINDING WHEEL DRESSING APPARATUS

Nils Hoglund, Summit, N. J.

Application February 6, 1952, Serial No. 270,197

11 Claims. (Cl. 125—11)

My invention relates to grinding wheel dressing apparatus, more particularly to apparatus for automatically dressing, turning and forming precise contours on grinding wheels.

Prior apparatus for forming contours have employed different methods, one such being the conventional crushing method where a preshaped crusher roller is used for forming the contour on the grinding wheel. Another employs a diamond tracing device which uses a templet usually having a one-to-one ratio which is contacted by a follower to guide the diamond cutting or dressing tool across the wheel to be dressed. Other devices of this kind have also utilized a pantograph arrangement which supports the cutting diamond. Dressing devices of previous apparatus have usually employed as their prime movers complicated hydraulic mechanisms which are comparatively costly.

Previous devices of this kind have also been complicated requiring much space. In many cases the devices are not automatically controlled for successively passing the cutting diamond across the face of the wheel being dressed. Manual control of this operation induces further error.

Another difficulty recently introduced has been the need for dressing very wide surfaces. Grinding wheels of great width or a plurality of wheels mounted on a single shaft for grinding ways, for example in lathe beds, are now coming into use. In this arrangement, where there is a wide wheel or two or more grinding wheels on the same shaft, dressing becomes a difficult problem because of the long distance the dressing tool must travel. This also results in long and big dressing apparatus and requires considerable time for the dressing operation because of moving the tool across the entire surface or surfaces being dressed. No practical method has previously been devised for dressing grinding wheels of this type.

It is, therefore, an object of my invention to provide an improved and simplified form of wheel dressing apparatus.

A further object of my invention is to provide such an improved apparatus which insures accurate contours by eliminating the need for pantograph operation with its accumulated errors during operation.

A further object of my invention is to eliminate hydraulic drive and to utilize electrical driving means of simple form.

A further object of my invention is to provide such an apparatus which is compact and which is automatic and which eliminates the skill required for dressing when manual operation or semi-manual operation is employed.

A further object of my invention is to provide an apparatus of the kind described which is capable of dressing wide surfaces or a plurality of grinding surfaces simultaneously.

A still further object of my invention is to provide a dressing tool which can dress wide surfaces or a plurality of surfaces in only a portion of the time required where conventional dressing tools are used.

More specifically it is an object of my invention to provide an apparatus capable of dressing different portions of a wide surface simultaneously and independently of each other.

Another object of my invention is to provide a dresser which can be mounted on the grinding bed with the work being ground and which can dress the wheel without moving the wheel.

These and other objects will appear hereinafter.

Briefly, in accordance with my invention I provide an apparatus having a base for supporting a housing movable longitudinally of the base and transversely of the wheel or wheels being dressed. This housing carries a pair of dressing tools slidably supported by the housing and independently movable of each other and radially of the wheel or wheels being dressed. These dressing tools are spaced apart on the housing and axially of the surface or wheels being dressed so that the device is capable of dressing two separate portions of the grinding wheel surface or surfaces of different wheels according to predetermined patterns and simultaneously. Inside the housing which is supported upon a main slide on the base are provided slides for supporting the tools which are movable normal to the housing movement and radially of the wheels being dressed. Slidably mounted on the housing are ratio slides for each of the tool slides. These ratio slides are movable normally of the tool slides and to the movement of the housing. They are connected to the tool slides to control their movement. Slides support the ratio slides and each is provided with a stylus or templet follower which is resiliently urged into contact with and follows the contour of a templet fixed to the base as the housing moves back and forth. A rack and pinion assembly is connected between the housing and the base. An electric motor is carried on the housing and drives the pinion and all of the elements supported by the housing are caused to reciprocate as the motor is periodically reversed.

The dresser may be positioned in registry with the lathe bed being ground and on the grinding bed with the lathe bed so that the dresser may move across the grinding wheel when it is moved into dressing position under the grinding wheel. The contour on the grinding wheel is made to register with and be in line with the ways being ground on the lathe bed so that it is unnecessary to move the grinding wheel. The lathe bed can be moved under the grinding wheel and relative thereto by moving the grinding bed.

In the drawings Figure 1 is a front perspective of a grinding wheel dressing apparatus made according to my invention, Figure 2 is a rear perspective of the device shown in Figure 1, Figure 3 is a plan view with portions of the cover broken away to show details of construction of the templet and slide mechanisms, Figure 4 is a front elevation with portions broken away to show details of the tool slide and ratio slide assemblies, Figure 5 is a perspective of the fixed base upon which the main slide and housing are slidably supported, Figure 6 is a section taken along line 6—6 of Figure 3 and Figure 7 is a section taken along the line 7—7 of Figure 3.

*General arrangement*

Referring to Figures 1 and 2, a grinding wheel dressing apparatus made according to my invention includes a base not visible in these figures but shown and described in the other figures and on which is mounted a main slide 10 movable lengthwise or longitudinally of the base and supporting a frame 11 providing a pair of housings 12 and 13 which house the tool slide assemblies slidably supporting the dressing tools 14 and 15. Also carried on and attached to the frame is the templet and motor cover 16 which in turn supports the electrical driving motor 17 and which also houses the driving gear to be described.

When the motor 17 is energized the slide 10 moves back and forth along the base and axially of the grinding wheel being dressed. As it does so tools 14 and 15 are made to follow an in and out or up and down movement in accordance with a pattern pre-established by templets or cams in a radial direction with respect to the grinding wheels being dressed. These tools are separate and are individually controlled independently of each other so that contours of different shape can be cut as the tools move along the width of the wheel being dressed. It will become obvious as the description proceeds that while only two tools are shown more could be used employing the same principles.

*Base and main slide*

Referring to Figures 3, 4, 5, 6 and 7, I provide a base and main slide and frame assembly mounted thereon for movement along the base. As shown in Figure 5 the elongated base 20 is provided with a main slide guide 21 and a raised support 22 on which is mounted the rack 23 and the cams or templets 24 and 25 which could be made separately or as a single cam or templet if desired. These cams are mounted between a pair of stop members 26 and 27 and may be shifted longitudinally by means of the adjusting screws 28 and 29 for fixing the position of the cams 24 and 25. The slide 10 and main frame 11 are slidably mounted on the slide guide 21 by means of ball bearing assemblies 18 and 19, which are shown in Figures 6 and 7.

*Dressing tool assembly*

The main frame houses and slidably supports the dressing tool assemblies, each of which comprises a tool slide housing fixed in the main frame housing, a tool slide slidably supported for vertical movement in the housing and supporting a dressing tool or diamond and a dust cover mounted on the slide.

Referring to Figures 3, 4, 6 and 7, there is supported within the frame housing 13 the tool slide housing and the tool slide for providing movement normal to the main slide 10. The tool slide housing 32 is received within the main frame housing 13 and is provided with a flange 33 which contacts and is fixed to the top of the frame housing 13. In Figure 4 the tool or dressing diamond and support and dust cover are not shown. These are shown in Figure 6 which shows a section along line 6—6 (also 6'—6') of Figure 3, it being understood that both tool assemblies are the same. The tool or diamond slide 34 is mounted on ball bearing assemblies 35 and 36 positioned between the slide 34 and ball bearing races or guides 37 and 38 mounted within the diamond slide housing 32. As shown in Figure 6 the tool slide has secured to its upper end the diamond dressing tool 40 and holder 41 secured to the slide 34. A dust cover 42 is also secured to the tool slide.

*Stylus slide*

Referring again to Figures 3, 4, 6 and 7, there is positioned below each of the tool slides and slide housings and between ball bearing assemblies 45 and 46 a stylus slide 47 which carries a replaceable stylus 48. The stylus or templet follower of one slide contacts cam 24 and that of the other cam 25. These slides are urged into contact with the templet by means of a compression spring 49 supported on the spring support pin or rod 50 in boss 51 on slide 47. The pin can slide into and out of the opening 52 in the frame housing as the slide 47 moves back and forth in response to the movement of the housing relative to the templets.

*Ratio slide*

To transfer movement of the stylus slide to the tool slide a ratio slide is employed. This ratio slide is connected between the stylus slide and the tool slide. As shown in Figures 3, 4, 6 and 7 there is mounted on each slide 47 a ratio slide 60 having a yoke shape for receiving ball bearing assemblies 61 and 62 slidably engaging ratio slide guide 63, which is mounted on slide 34 at an angle to the vertical corresponding to the angle of the slot in the yoke to obtain a proper ratio of movement between the slides. A pin 64 fixes slide guide 63 on slide 34.

Referring specifically to Figure 7, as the stylus slide 47 reciprocates back and forth from left to right, the ratio slide 60 moves with it so that the resultant forces on the slide guide 63 and pin 64 force them and slide 34 to move up and down within the ball bearing assemblies. Changing the angle or slope of the slot in the ratio slide yoke will change the relative movement of the tools with respect to the cams.

*Motor drive*

An automatically reversible electric motor 17 is mounted on the main slide and attached to the templet cover. The gear housing comprises the portion of the cam or templet cover 70 and a part forming the motor housing 71 fastened to the part 70 and supporting the motor which is provided with a shaft on which the worm 73' is mounted engaging the gear 73 fixed to shaft 72, the shaft 72 being rotatably supported in the portion 70 of the cover. The gear 74 is fixed to shaft 72 and rotates therewith and engages the rack 23 so that as the motor is driven the gear rotating in one direction or the other causes the main slide supported to move along the slide guide 21 mounted on the base.

Operation

When motor 17 is energized it drives the shaft 72 by means of the worm and worm gear 73' and 73, causing rotation of gear 74. Since this gear assembly is fixed to the cover it forces the main slide 10 and the main frame 11 with the tools 14 and 15 to travel longitudinally of the base and axially of the grinding surfaces being dressed. As the assembly moves back and forth along the base, the styli 48, which engage the cam surfaces 24 and 25 are caused to move normally of the movement of the main slide against compression springs 49 moving the slides 47 and the ratio slides 60 fixed to slide 47. As described above, this movement causes the slide 34 fixed to pin 64 to move up and down or normally to the slide 47 as well as with respect to the movement of the main slide, causing the tools to move radially to a greater or less extent depending upon the contour on the cam surfaces. It will be seen that each of the tools is separately controlled and can move independently of the other to provide a different contour or shape on the surfaces of the wheel being dressed. It is also obvious that the principles employed here can be extended to cover two or more dressing tools which function in substantially the same way and for producing entirely different contours since each tool is independent of the other.

What I claim is:

1. A grinding wheel contour forming apparatus including an elongated base, a main slide slidably mounted for longitudinal movement along said base, a plurality of slides slidably mounted on said main slide and movable normally to said longitudinal movement in a plane parallel to the plane of said main slide, other slides mounted on said main slide and movable normally to the movement of said plurality of slides and said longitudinal movement, dressing tools mounted on said other slides, mechanisms connecting each of said plurality of slides and said other slides whereby movement of said plurality of slides will cause movement of said other slides, means mounted on said main slide for moving said main slides and mechanism connected between said plurality of slides and said base for individually controlling each of said dressing tools to form different contours simultaneously.

2. A grinding wheel contour forming apparatus including a base, a main slide mounted for movement along said base, a first slide mounted on said main slide and movable normally to the movement of said main slide, a second slide mounted on said main slide and movable normally to the movement of said first slide and said main slide, a dressing tool mounted on said second slide, a ratio slide mechanism connecting said first and said second slides and including a yoke-shaped slide and a slide guide mounted within said yoke whereby movement of said first slide will cause movement of said second slide, a templet fixed to said base, said first slide having a templet follower contacting said templet and means connected between said base and main slide for reversibly moving said main slide along said base.

3. A grinding wheel contour forming apparatus including an elongated base, a housing slidably mounted for longitudinal movement along said base, a plurality of slides slidably mounted on said housing and movable normally of said longitudinal movement, other slides mounted on said housing and movable normally to the movement of said plurality of slides and said longitudinal movement, dressing tools mounted on said other slides, ratio slide mechanisms connected between each of said plurality of slides and said other slides whereby movement of said plurality of slides will cause movement of said other slides, a driving means mounted on said housing, and a rack and pinion mechanism connected between said base and driving means for reciprocally moving said housing, and a templet and follower mechanism connected between each of said plurality of slides and said base for individually controlling each of said dressing tools to form different contours simultaneously.

4. A grinding wheel dressing apparatus including a base, a main slide movable along said base in a horizontal plane and supporting a housing, a plurality of dressing tools slidably mounted in said housing on said main slide and movable independently of each other in a vertical direction, said tools being movable parallel to each other and normally to the movement of said main slide, means connected between said slide and said base for moving said main slide along said base, means connected to each of said tools for controlling movement of each of said tools independently of the other as said main slide is moved along said base, the means connected to each of said tools for controlling movement thereof including a slide movable normally to the movement of said main slide and said tool slide, said last slide supporting a stylus, and a templet mounted on said base contacted by said stylus and resilient means for urging said stylus into contact with said templet, said slide supporting said stylus supporting a ratio slide and slide guide connected between said tool slide and said stylus slide, said ratio slide including a yoke-shaped member and receiving said slide guide therein, the throat of said yoke and said slide guide being at an angle to the direction of movement of said tools.

5. A grinding wheel dressing apparatus including a base, a main slide movable along said base, a plurality of dressing tools slidably mounted on said main slide and movable independently of each other, and means on said main slide supporting said tools for movement parallel to each other and normally to the movement of said main slide, means connected to each of said tools for controlling movement of each of said tools independently of the other as said main slide is moved along said base, and means connected to each of said tools for controlling movement thereof including a slide movable normally to the movement of said main slide and said tool slide, said last means including a stylus, a templet mounted on said base contacted by said stylus, spring means for urging said stylus into contact with said templet, said slide supporting said stylus supporting a ratio slide connected between said tool slide and said slide supporting said stylus, driving means mounted on said main slide having a driving gear, and a rack mounted on said base and contacted by said gear whereby energization of said driving means will cause movement of said main slide and movement of said tools in response to movement of said slide.

6. A grinding wheel contour forming apparatus including an elongated base, a main slide mounted for longitudinal movement along said base, a first slide mounted on said main slide and movable normally to said longitudinal movement, a second slide mounted on said main slide and movable normally to the movement of said first slide and said main slide, a dressing tool mounted on said second slide, a ratio cam mechanism connected between said first and said second slides and including a yoke-shaped slide and a slide guide slidably mounted within said yoke-shaped slide whereby movement of said first slide will cause movement of said second slide, a templet fixed to said base, said first slide having a templet follower contacting said templet and means connected to said main slide and said base for reversibly moving said main slide along said base.

7. A grinding wheel dressing apparatus including a base, a slide guide mounted on said base, a main slide movable along said slide guide, a plurality of dressing tools slidably mounted on said main slide and movable independently of each other, said tools being supported on slides movable parallel to each other and normally to the direction of movement of said main slide, means on said base and means connected to each of said tool slides for controlling movement of each of said tools independently of the other as said main slide is moved along said base, the means connected to each of said tools for controlling movement thereof including a slide movable normally to the direction of movement of said main slide and said tool slides, said last means including a stylus, templet means mounted on said base adjacent the slide guide on said base and contacted by said stylus and spring means for urging said stylus into contact with said templet, said slide supporting said stylus supporting a ratio slide, a slide guide engaging said ratio slide and connected to said tool slide, an electric motor mounted on said main slide and having a driving gear and a rack mounted on said base and contacted by said gear whereby energization of said motor will cause movement of said main slide and movement of said tools in response to movement of said slide.

8. A grinding wheel dressing apparatus including an elongated base, a slide guide mounted on said base, a housing slidably mounted on said slide guide for longitudinal movement along said base, a plurality of slides slidably mounted on said housing and movable normally of said longitudinal movement, other slides mounted on said housing and movable normally to the movement of said plurality of slides and said longitudinal movement, dressing tools mounted on said last slides, ratio slide mechanisms connected between each of said plurality of slides and said other slides whereby movement of said plurality of slides will cause movement of said other slides, a driving means mounted on said housing, a rack and pinion mechanism connected between said base and driving means for moving said housing, said rack being mounted on said base parallel to the slide guide on said base, a support adjacent the slide guide on said base, removable templet means mounted on said support and having different contours along its length, each of said plurality of slides having a templet follower engaging different portions of said templet means whereby each of said dressing tools follows different paths when said housing is moved along said base.

9. A grinding wheel dressing apparatus including a base, a main slide movable along said base, a plurality of dressing tools slidably mounted on said main slide and movable independently of each other, said tools being movable parallel to each other and normally to the movement of said main slide, means for moving said main slide along said base, means connected to each of said tools for controlling movement of each of said tools independently of the other as said main slide is moved along said base, the means connected to each of said tools for controlling movement thereof including a slide movable normally to the movement of said main slide and said tool slide, said last means including a stylus, and a templet mounted on said base and contacted by said stylus and spring means for urging said stylus into contact with said templet, said slide supporting said stylus supporting a ratio slide connected to said tool slide.

10. A grinding wheel dressing apparatus including an elongated base, a slide guide mounted on said base, a rack mounted on said base parallel to said slide guide, a main slide mounted on said slide guide for longitudinal movement along said base, a first slide mounted on said main slide and movable normally to said longitudinal movement in a plane parallel to the plane of movement of said main slide, a second slide mounted on said main slide and movable normally to said first slide and said main slide, a dressing tool mounted on said second slide, a ratio slide mechanism connected between said first and said second slides and including a yoke-shaped slide and a slide guide slidably mounted within said yoke-shaped slide and connected to said second slide whereby movement of said first slide will cause movement of said second slide, a templet fixed to said base adjacent the slide guide on said base, said first slide having a stylus contacting said templet and electrical driving means having a gear engaging said rack for reversibly moving said main slide along said base.

11. A grinding wheel dressing apparatus including an elongated base, a slide guide mounted on said base, a rack mounted on said base parallel to said slide guide, a main slide mounted on said slide guide for longitudinal movement along said base, a first slide mounted on said main slide and movable normally to said longitudinal movement in a plane parallel to the plane of movement of said main slide, a second slide mounted on said main slide and movable normally to said first slide and said main slide, a dressing tool mounted on said second slide, a ratio slide mechanism connected between said first and said second slides and including a yoke-shaped slide and a slide guide slidably mounted within said yoke-shaped slide and connected to said second slide whereby movement of said first slide will cause movement of said second slide, the throat in said yoke and the slide guide mounted therein being at an angle to the direction of movement of said second slide, a templet fixed to said base adjacent the slide guide on said base, said first slide having a stylus contacting said templet and electrical driving means having a gear engaging said rack for reversibly moving said main slide along said base.

NILS HOGLUND.

References Cited in the file of this patent

UNITED STATES PATENTS

| Number | Name | Date |
|---|---|---|
| 274,563 | Clemons | Mar. 27, 1883 |
| 2,332,560 | Davis | Oct. 26, 1943 |
| 2,433,027 | Casella | Dec. 23, 1947 |

FOREIGN PATENTS

| Number | Country | Date |
|---|---|---|
| 610,817 | Germany | Mar. 18, 1935 |